United States Patent [19]

Schroeder et al.

[11] 4,200,202
[45] Apr. 29, 1980

[54] BEVERAGE DELIVERY SYSTEM

[75] Inventors: Karl Schroeder, 3966 S. 44th St., Greenfield, Wis. 53220; James A. Pappas, Glendale, Ariz.

[73] Assignee: Karl Schroeder, Greenfield, Wis.

[21] Appl. No.: 953,616

[22] Filed: Oct. 23, 1978

[51] Int. Cl.² ............................................. F25D 25/04
[52] U.S. Cl. .................................. 221/150 R; 221/274
[58] Field of Search ................... 221/150 R, 236, 254, 221/274, 275, 150 HC; 312/36, 236

[56] References Cited

U.S. PATENT DOCUMENTS

| 2,150,863 | 3/1939 | Morin | 312/36 X |
| 2,853,205 | 9/1958 | Boyd | 221/254 X |

Primary Examiner—Stanley H. Tollberg
Attorney, Agent, or Firm—Andrus, Sceales, Starke & Sawall

[57] ABSTRACT

A generally sealed container storage and cooling chamber is disposed beneath the top surface of a piece of furniture. A container transport device is disposed in the chamber and is adapted to present one container at a time to a vertically oriented delivery device. The delivery device comprises a generally cylindrical vertical guide channel having a container release opening in its side and which communicates with the transport device. The top of the guide channel forms an access opening in the top surface of the furniture. A feed piston is slideably mounted in the guide channel and is movable between a lowered and a raised position. When the piston is in its raised position, its side wall blocks the container release opening, and its top wall forms a support for a beverage container and may also complete the top furniture surface. When the piston is in its lowered position, a beverage container is delivered by gravity through the release opening and onto the piston top wall. A motive device is provided to lower the piston into container receiving position and to then raise the piston and beverage container to provide access by the user to the beverage. The top wall of the piston may be positioned flush, above or below the top furniture surface.

7 Claims, 6 Drawing Figures

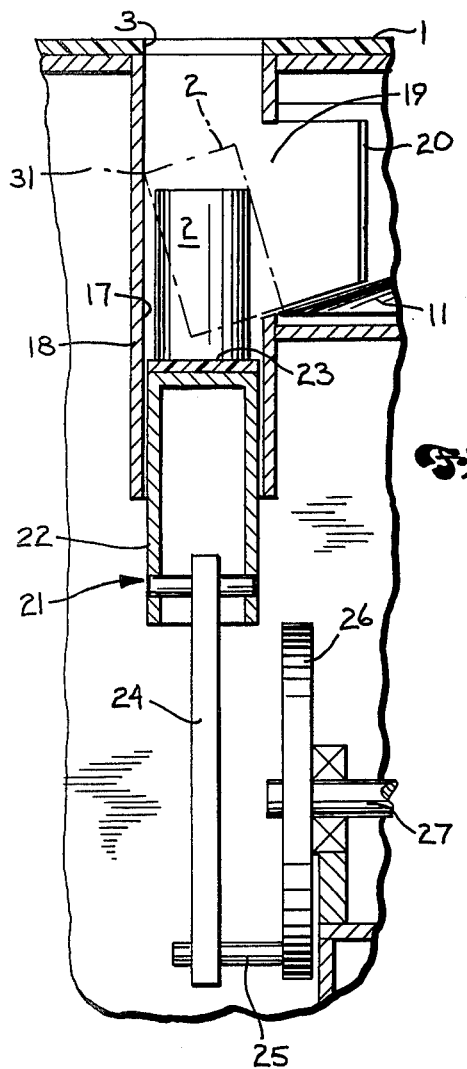
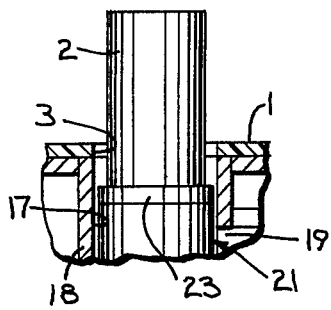
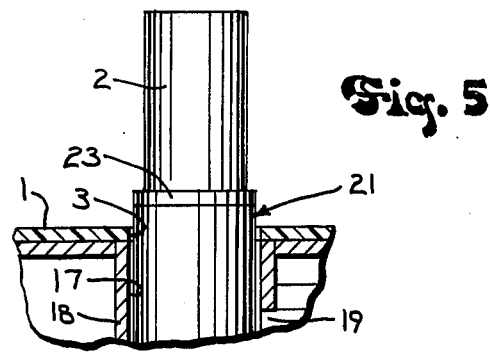
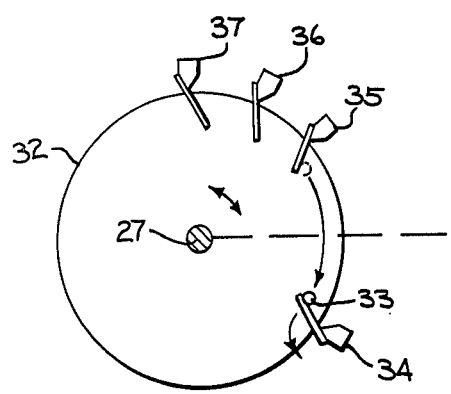
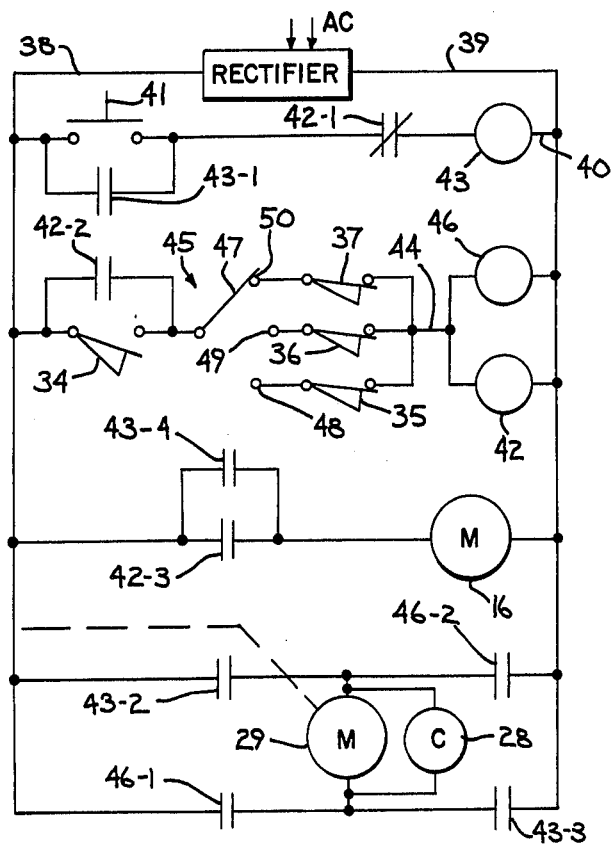

BEVERAGE DELIVERY SYSTEM

BACKGROUND AND SUMMARY OF THE INVENTION

This invention relates to a beverage delivery system and more particularly to an arrangement for transporting and delivering beverage containers on demand from a storage and cooling area upwardly to the top surface of an item of furniture, such as a chair arm, ping pong table or bar.

When a person is playing a game, reading or just drinking, he may wish to quickly obtain a cooled containerized beverage which is close at hand. The present invention is directed to a unique system for satisfying the person's need.

In accordance with one aspect of the invention, a generally sealed container storage and cooling chamber is disposed beneath the furniture surface. A container transport device is disposed in the chamber and is adapted to present one container at a time to a vertically oriented delivery device.

In accordance with another aspect of the invention, the delivery device comprises a generally cylindrical vertical guide channel having a container release opening in its side and which communicates with the transport device. The top of the said guide channel forms an access opening in the top surface of the furniture. A feed piston is slideably mounted in the guide channel and is movable between a lowered and a raised position.

When the piston is in its raised position, its side wall blocks the container release opening, and its top wall forms a support for a beverage container and may also complete the top furniture surface. When the piston is in its lowered position, a beverage container is delivered by gravity through the release opening and onto the piston top wall.

A motive device is provided to lower the piston into container receiving position and to then raise the piston and beverage container to provide access by the user to the beverage. The top wall of the piston may be positioned flush, above or below the top furniture surface.

BRIEF DESCRIPTION OF THE DRAWINGS

The accompanying drawings illustrate the best mode presently comtemplated by the inventors for carrying out the invention.

In the drawings:

FIG. 3 is an enlarged fragmentary elevational view showing the feed piston in its lowered position and passage of a beverage container through the release opening;

FIG. 4 is a fragmentary view showing positioning of the piston top wall below the furniture top surface;

FIG. 5 is a view showing positioning of the piston top wall above the furniture top surface; and FIG. 6 is a schematic circuit diagram for the controls.

DESCRIPTION OF THE PREFERRED EMBODIMENT

Figure 1:
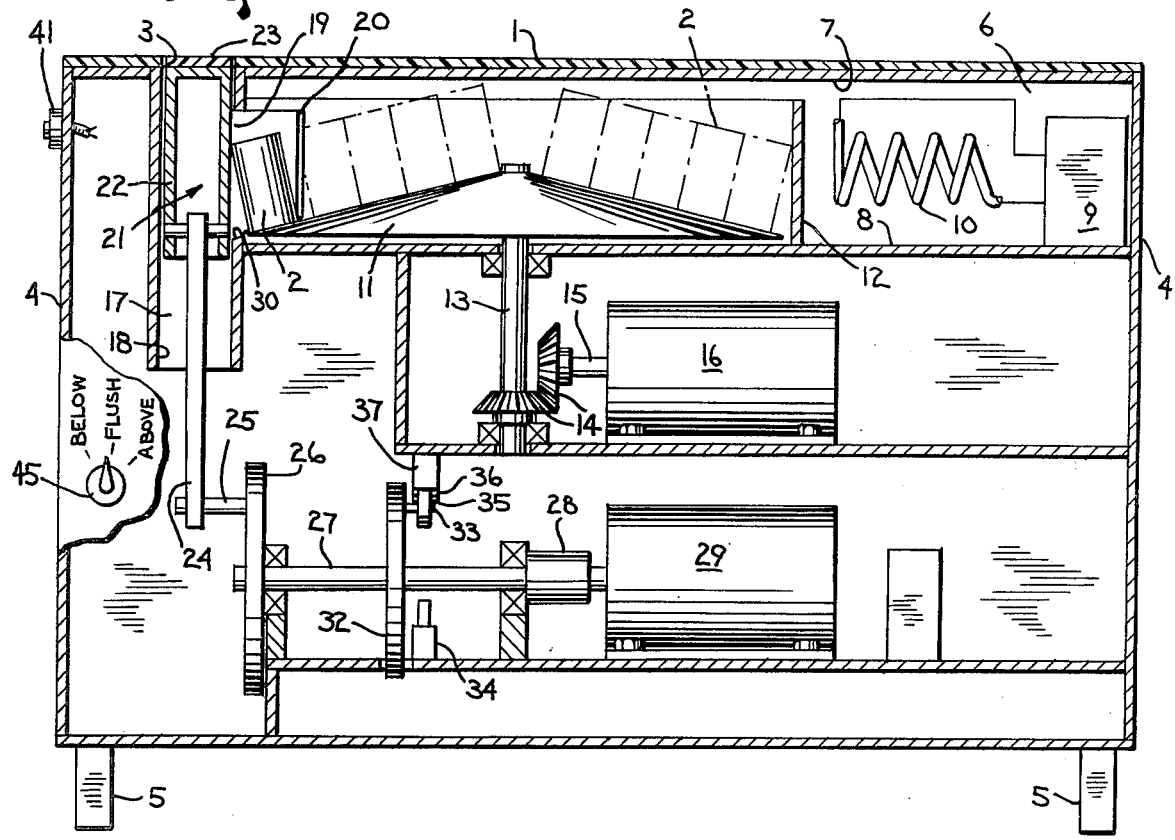
FIG. 1 is a schematic vertical sectional view of a beverage delivery device constructed in accordance with the invention, taken on line 1—1 of FIG. 2.

Although the concepts of the invention are contemplated for use in conjunction with any suitable piece of furniture, the present embodiment is adapted for use with a ping pong table having a horizontal top 1 shown schematically in FIG. 1. It is desired to deliver a beverage container 2 through an access opening 3 in top 1. The containers shown herein are soda or beer cans, but may be of other varieties.

The beverage delivery system of the invention is shown as being disposed within a housing 4 extending downwardly from top 1 and supported on the floor by feet 5.

A beverage cooling chamber 6 is disposed in the upper portion of housing 4 and is defined, in part, by a ceiling 7, a floor 8 and a portion of the wall of housing 4. Chamber 6 contains a suitable motorized compressor 9 and cooling coils 10 for purposes of refrigerating any containers 2 disposed in the chamber.

Figure 2:
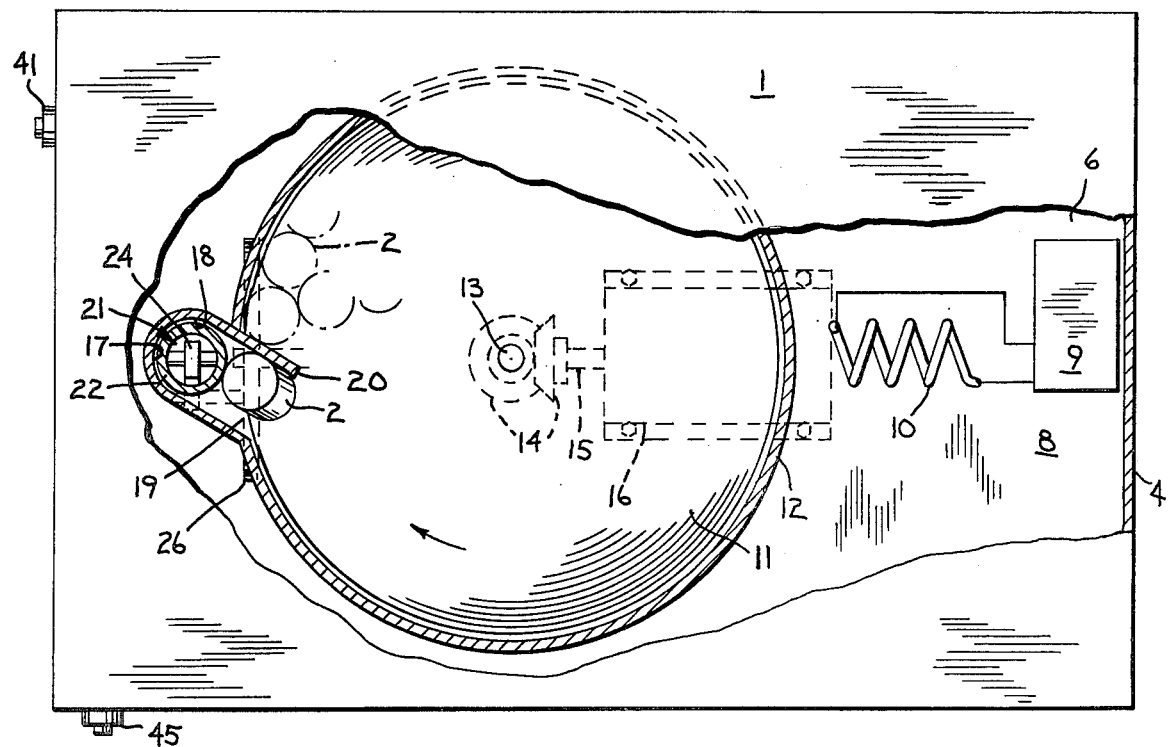
FIG. 2 is a top plan view of the device, with parts broken away and in section.

Means are disposed within chamber 6 to store and transport beverage containers 2. For this purpose, and in the present embodiment, a conical smooth surface turntable 11 is provided within a circular retaining wall 12 in the chamber and forms an outwardly and downwardly inclined supporting floor for a plurality of containers 2, as shown in FIGS. 1 and 2. Turntable 11 is connected through a downwardly extending shaft 13 and suitable gearing 14 to the shaft 15 of a drive motor 16 mounted beneath chamber 6. Actuation of motor 16 causes turntable 11 to rotate, as will be described more fully hereinafter.

A vertical guide channel 17 having an outer wall 18 is disposed closely adjacent turntable 11 and extends downwardly from opening 3 in the table top 1. Wall 18 is co-joined with retaining wall 12 and a release opening 19 communicates between the cooling chamber and guide channel 17 closely adjacent the edge of turntable 11. Opening 19 is large enough to permit a beverage container 2 to pass therethrough. Channel wall 18 is formed inwardly toward turntable 11 at opening 19 to form a flap-like angular stop 20. Thus, as shown in FIG. 2, when turntable 11 is rotated, containers 2 will tend to approach opening 19 one-by-one in succession. However, an outermost container 2 will be prevented by stop 20 from moving circumferentially past opening 19.

The invention contemplates the transfer and delivery of one beverage container at a time to the table top from turntable 11, which is offset laterally beneath access opening 3. For this purpose, a feed piston 21 is disposed for vertical sliding movement in guide channel 17. Piston 21 has a side wall 22 and a top or end wall or platform 23. The lower end of piston 21 is provided with a downwardly extending piston rod 24 which is connected to a pin 25 and disc 26 forming a rotary crank. Disc 26 is connected through a shaft 27 and suitable electromagnetic clutch 28 to a drive motor 29 mounted beneath motor 16 within housing 4. Clutch 28 also functions to brake the action of piston 21 when motor 29 is de-activated.

In the showing of FIG. 1, motor 29 has positioned the crank and feed piston 21 so that the latter is in a raised position with piston platform 23 level with access opening 3 and flush with the uppermost surface of table top 1. When piston 21 is in its raised position, its side wall 22 blocks release opening 19 so that a container 2 cannot slide off turntable 11, pass through release opening 19 and into guide channel 17.

Referring to FIG. 3, when motor 29 is actuated, feed piston 21 lowers in channel 17 until its top wall 23 is slightly below the lower edge 30 of release opening 19. Since the opening is no longer blocked, a container 2 will slide off turntable 11, assisted by angular stop 20 which acts as a deflector. Since the container is at first inclined, its forward top edge 31 engages channel wall 18 and its bottom then drops vertically downwardly onto piston platform 23. Motor 29 then causes piston 21 and the container thereon to rise and thereby deliver the container to the top of the table.

When the top wall or platform 23 of piston 21 is at the uppermost end of the piston stroke, the container bottom may be positioned at a variety of levels relative to top 1. The container bottom may be positioned below top 1, as in FIG. 4; or above top 1, as in FIG. 5. Alternately, it may be flush with top 1 when the piston is disposed as in FIG. 1.

Referring particularly to FIG. 6, a schematic circuit illustration is given employing a cam driven switch assembly for controlling the movement of turntable 11 and the positioning of piston 21.

A disc-like cam 32 is illustrated as coupled to the shaft 27 of motor 29 and is driven in synchronism therewith. Cam 32 includes a switch operator, shown as a pin 33, adapted to actuate four limit switches including a loading limit switch 34, a below top level limit switch 35, a flush limit switch 36 and an above top level limit switch 37.

The motors 16 and 29 are illustrated as well known reversible DC motors connected to DC power lines 38 and 39 through control relay contacts are presently described. The motors may be of the variable speed type for fine adjustment and variation in delivery speed and the output of the motors is preferably of low speed, for example 3.8 r.p.m. Lines 38 and 39 are shown in FIG. 6 as connected to a suitable AC-DC rectifier placed in the incoming aC power line.

Motor 29 is controlled from a loading or forward drive branch 40 which is operative to energize the motor for forward rotation to thereby lower the platform 23. Branch 40 includes a normally open start switch 41 connected in series with a set of normally closed relay contacts 42-1 of the reverse drive interlock relay 42 and a forward drive interlock relay 43. Relay 43 includes a set of interlock contacts 43-1 connected in parallel with the start switch 41 such that once the relay is energized, it remains energized as long as the relay contacts 42-1 are closed. The forward drive interlock relay 43 further includes normally open forward drive contacts 43-2 and 43-3 connected between the opposite sides of the motor 29 and power lines 38 and 39 to provide current flow from line 38 to the top side of motor 29, through the motor and back to the opposite power line 39. This rotates motor 29 in a direction to retract the piston and lower the platform 23. Simultaneously, cam 32 rotates in a direction moving pin 33 into the path of the loading limit switch 34 which is connected in the reverse drive branch 44 of the control circuit. Loading limit switch 34 is normally open. When the piston unit reaches the bottom load position, limit switch 34 is engaged by pin 33 and is closed to complete the reverse drive branch 44 to open forward drive branch 40 and after a predetermined time delay, to energize motor 29 for a reverse rotation.

The reverse drive branch 44 includes a level selection switch 45 which is manually operated to connect one of the three level limit switches 35-37 into branch 44 with limit switch 34 and a pair of parallel control relays 42 and 46.

Level selection switch 45 includes a common contact arm 47 providing a common power connection to power line 38 as shown. Contact arm 47 selectively engages with any one of three contacts 48, 49 and 50 connected respectively to the below top, flush and above top limit switches 35-37. The opposite sides of limit switches 35-37 are connected in common to each other and to the opposite power line 39 through the parallel control relays 42 and 46.

Upon energization of control relay 42, which acts as a reverse drive interlock, contact 42-1 opens, thereby opening the forward branch circuit 40 and de-energizing forward drive interlock relay 43 and dropping out the forward drive. Simultaneously, relay 42 closes a set of contacts 42-2 connected in parallel with the loading limit switch 34 to thereby latch in the circuit to the relay 43 through one of the closed and operative limit switches 35-37, shown herein as limit switch 37. Control relay 46 is energized simultaneously with relay 42. Relay 46 functions as a time delay relay controlling normally open timing contacts 46-1 and 46-2. These contacts are connected to the opposite sides of motor 29 to reverse the direction of power flow from the power lines 38-39 to create opposite directional energization. The time delay relay 46 thus operates to close its contacts 46-1 and 46-2 only after a preselected time delay which may be made adjustable through any suitable control.

Therefore, after a predetermined period of piston 21 being in the lower or load position, the timing contacts 46-1 and 46-2 close, energizing motor 29 to establish a reverse rotation and raise piston 21. The latched reverse drive branch 44 can be opened by only that level limit switch 35-37 which is operatively connected into the reverse drive branch 44. During the counterclockwise rotation of cam 32 from the loading position, pin 33 first engages the below top level limit switch 35. If the switch is not operatively connected in circuit, motor rotation continues and pin 33 next engages the flush limit switch 36. If switch 36 is not effective, rotation continues and pin 33 engages the above top level limit switch 37. The platform 23 is thus returned to the selected level.

In the illustrated embodiment of the invention, turntable motor 16 operates continuously during the cycling of the loading drive motor 29. Motor 16 is shown connected directly to the power lines 38-39 thrugh parallel contacts 43-4 and 42-3 associated with the reverse and forward drive interlock relays 42 and 43 respectively. When either of the relays 42 or 43 is energized, contacts to motor 16 are closed. As a result, motor 16 continues to operate until such time as the reverse level condition is obtained and relay 42 is de-energized.

It may be desirable, as with ping pong and billiard tables, to provide a plurality of beverage delivery devices, one at each corner.

Furthermore, it may be preferable to construct platform 23 to match the furniture top surface. In such event, and when platform 23 is flush with top 1, the two elements will be visually alike and provide a continuous uniform top.

Various modes of carrying out the invention are contemplated as being within the scope of the following claims particularly pointing out and distinctly claiming the subject matter which is regarded as the invention.

We claim:

1. A beverage container delivery device for use with an item of furniture having a horizontal top with an access opening therein, comprising:

(a) beverage container transport means disposed beneath the said top for transporting a plurality of containers to a position laterally offset from and beneath the said top opening,
(b) a vertical wall forming a guide channel extending downwardly from said top opening and with said wall having a release opening therein facing said transport means,
(c) a beverage container handling piston disposed in said guide channel and with said piston having a top wall,
(d) and means to move said piston between a lowered and a raised position at said access opening,
(e) said piston comprising means to block said release opening against passage therethrough of said containers between said transport means and said guide channel when said piston is in its said raised position.

2. The device of claim 1 wherein said top wall is disposed below the bottom edge of said release opening when said piston is in its said lowered position so that a container passing through said release opening falls downwardly onto said top wall.

3. The device of claim 1 or 2 which includes means to move said piston from its said lowered position to a said raised position so that said top wall is selectively disposed beneath, flush with or above said horizontal furniture top.

4. The device of claim 3 wherein said transport means comprises:
(a) a conical turntable disposed adjacent said release opening and with said turntable forming an outwardly and downwardly inclined container-supporting floor,
(b) and means to rotate said turntable to cause containers thereon to approach said access opening one-by-one in succession.

5. The device of claim 1 or 2 wherein said transport means comprises:
(a) a conical turntable disposed adjacent said release opening and with said turntable forming an outwardly and downwardly inclined container-supporting floor,
(b) and means to rotate said turntable to cause containers thereon to approach said access opening one-by-one in succession.

6. The device of claim 5 which includes a deflector extending from said release opening toward said turntable to hold a single container in place at said release opening when said turntable is rotated.

7. The device of claim 6:
(a) wherein said turntable is disposed within a chamber disposed beneath said furniture top,
(b) and beverage cooling means disposed within said chamber.

* * * * *